(12) United States Patent
D'Apuzzo et al.

(10) Patent No.: US 12,491,719 B2
(45) Date of Patent: Dec. 9, 2025

(54) PRINT CARTRIDGE REGISTRATION SYSTEMS

(71) Applicant: Hewlett-Packard Development Company, L.P., Spring, TX (US)

(72) Inventors: Fausto D'Apuzzo, Palo Alto, CA (US); Yang Lei, Palo Alto, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 181 days.

(21) Appl. No.: 18/275,789

(22) PCT Filed: Feb. 4, 2021

(86) PCT No.: PCT/US2021/016671
§ 371 (c)(1),
(2) Date: Aug. 3, 2023

(87) PCT Pub. No.: WO2022/169451
PCT Pub. Date: Aug. 11, 2022

(65) Prior Publication Data
US 2024/0294014 A1    Sep. 5, 2024

(51) Int. Cl.
*B41J 2/175*    (2006.01)
*G06V 10/10*    (2022.01)
*G06V 10/75*    (2022.01)
*H04N 1/00*    (2006.01)

(52) U.S. Cl.
CPC .......... *B41J 2/17546* (2013.01); *G06V 10/19* (2022.01); *G06V 10/751* (2022.01); *H04N 1/00251* (2013.01)

(58) Field of Classification Search
CPC ... B41J 2/17546; G06V 10/751; G06V 10/19; H04N 1/00251
See application file for complete search history.

(56) References Cited

U.S. PATENT DOCUMENTS

| | | |
|---|---|---|
| 6,616,263 B2 | 9/2003 | Allen et al. |
| 8,075,080 B2 | 12/2011 | Albertalli et al. |
| 8,104,692 B2 | 1/2012 | Sjolander et al. |
| 8,842,331 B1 | 9/2014 | Enge |
| 2008/0184809 A1 | 8/2008 | Shvets et al. |
| 2013/0203627 A1 | 8/2013 | Moll et al. |
| 2019/0126637 A1 | 5/2019 | Collier et al. |
| 2021/0008788 A1* | 1/2021 | Murphy ............... B29C 64/182 |

* cited by examiner

*Primary Examiner* — Jason S Uhlenhake
(74) *Attorney, Agent, or Firm* — Foley & Lardner LLP

(57) ABSTRACT

In example implementations, an apparatus is provided. The apparatus includes a moveable stage, a print cartridge, a camera, and a processor. The moveable stage is to hold a well plate. The print cartridge holder is to hold a print cartridge that includes a print die over the moveable stage. The camera is located above the movable stage and the print cartridge holder. The camera is positioned such that the movable stage and the print die are within a field of view of the camera. The processor is to calculate a first offset a first offset of the well plate and a second offset of the print die. The movement of the movable stage is controlled by the processor in accordance with the first offset and the second offset.

12 Claims, 7 Drawing Sheets

PRINT CARTRIDGE REGISTRATION SYSTEMS

CROSS-REFERENCE TO RELATED APPLICATIONS

This application is filed under 35 U.S.C. § 371 as a National Stage of PCT International Application No. PCT/US2021/016671, filed Feb. 4, 2021, which is incorporated by reference herein in its entirety.

BACKGROUND

Some life science applications can use printers to mix fluids with bio matter to perform analysis, experiments, and the like. The printers can eject low volume droplets (e.g., in the pico-liter range) that can be leveraged for sample preparation in life science applications, such as quantitative plasmonic sensing and tissue staining. The printers may allow many samples to be prepared simultaneously using a well plate with a plurality of wells. The printer may eject fluids into desired wells with relative high accuracy.

DETAILED DESCRIPTION

Examples described herein provide an apparatus, and a method for using the same, to register a bio printer apparatus. As discussed above, some life science applications can use a bio-printer to dispense fluids into wells of a well plate to prepare samples, stain tissue, and the like. However, the wells and each slot of the print dot that ejects fluid may be relative small (e.g., dimensions in the microns). Each time a well plate is placed onto a stage or a new print cartridge is inserted, small variations in location may cause misalignments. As a result, small offsets in the well plate relative to the print die may cause misfires of the fluid ejected from the print die. The misfires can lead to bad samples or inefficient operation.

The present disclosure provides a registration system that may use a single camera and light source to measure an amount of offset of the well plate and the print die. The offset may be accounted for by a processor controlling movement of a stage that holds the well plate. Thus, the movement and alignment of the wells within the well plate relative to a particular slot of the print die may be controlled in a precise and deterministic way. The fluids may be ejected precisely into a desired well using by compensating movement of the stage by the calculated offsets.

Figure 1:
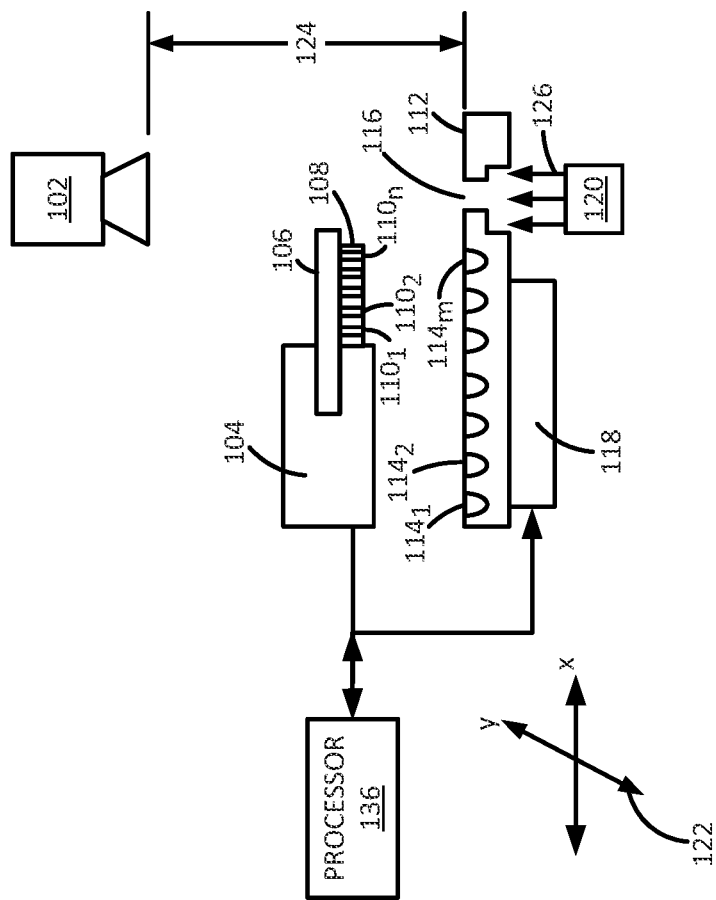
FIG. 1 is a block diagram of an example registration apparatus of the present disclosure.

FIG. 1 illustrates an example registration apparatus 100 of the present disclosure. In an example, the apparatus 100 may include a camera 102, a print cartridge holder 104, a stage 118, and a light source 120. A processor 136 may be communicatively coupled to the camera 102, the print cartridge holder 104, the stage 118, and the light source 120.

In an example, the stage 118 may be a movable stage that holds a well plate 112 or any other sample preparation item. The processor 136 may control movement of the stage 118 along a two-dimensional plane. For example, the two-dimensional plane may be along a y-axis and an x-axis as shown by the axis 122.

The well plate 112 may include a plurality of wells $114_1$ to $114_m$ (hereinafter referred to individually as a well 114 or collectively as wells 114). The wells 114 may selectively receive fluid ejected by a print die 108 held by the print cartridge holder 104.

In an example, the print die 108 may be deployed in a print cartridge 106 that is held by the print cartridge holder 104. The print cartridge 106 may be held in a fixed position over the well plate 112 and the stage 118 by the print cartridge holder 104, while the stage 118 is moved along the x and y axis below the print cartridge holder 104. The print die 108 may be a thermal inkjet (TIJ) resistor print die. A TIJ resistor print die may locally heat fluids using a resistive heater that create bubbles in the fluid. The force of the bubbles can cause small volumes of fluid to be ejected via nozzles $110_1$ to $110_n$ (hereinafter also referred to individually as a nozzle 110 or collectively as nozzles 110). The processor 136 may control activation of the print die 108 to eject fluid out of the nozzles 110.

In an example, the diameters of the wells 114 may be very small (e.g., in the order of centimeters). The diameter of the nozzles 110 may also be very small (e.g., in the order of microns). When a well plate 112 is placed on the stage 118, there may be small amounts of variation in the location of the well plate 112. In addition, each time a new print cartridge 106 is placed in the print cartridge holder 104, there may be small amounts of variation in the location of the print die 108 and the nozzles 110. The small amounts of variation may cause a misalignment when a well 114 is moved below a particular nozzle 110, causing a misfire. As a result, the fluid may be not be accurately ejected or dispensed into the desired well 114.

The present disclosure uses the camera 102 and the light source 120 to capture images of the position of the well plate 112 and the print die 108. The processor 136 may control operation of the camera 102 and the light source 120 during a registration process of the well plate 112 and the print die 108.

In an example, the processor 136 may control the camera 102 and the light source 120 to capture images of the well plate 112 and the print die 108. The camera 102 may be located above the stage 118 and the print cartridge holder 104. The light source 120 may be located below the stage 118 to emit the light rays 126 up towards the camera 102.

The processor 136 may receive the images and analyze the images to calculate a first offset associated with the well plate 112 and a second offset associated with the print die 108. The processor 136 may then store the offsets and adjust movements of the stage 118 to compensate for the first offset and the second offset that are calculated using the images captured by the camera 102.

In an example, the camera 102 may be any type of imaging device. For example, the camera 102 may include an imaging sensor to capture the image and an objective lens to focus the image. The camera 102 may be a red, green, blue (RGB) camera, a black and white camera, and the like.

In an example, the light source 120 may be any type of light source. For example, the light source 120 may be a light emitting diode (LED), an incandescent light bulb, a xenon light source, and the like. The light source 120 may emit light rays 126 towards the camera 120. The light rays 126 may help to illuminate certain areas of the print die 108 and the well plate 112 to perform the registration process.

In an example, the well plate 112 may include at least one fiducial 116. The fiducial may be a reference marking, opening, etching, or any other type of indicator on the well plate 112. The fiducial 116 may be optically clear or may be an opening to allow the light rays 126 to pass through the fiducial 116 towards the camera 102. The fiducial 116 may have a circular shape or any other geometric shape.

The fiducial 116 may be located on an outer edge or corner of the well plate 112. The well plate 112 may include more than one fiducial 116 to improve the accuracy of the offset calculation. For example, the well plate 112 may include fiducials 116 on the four corners of the well plate 112.

The light rays 126 may also pass through the nozzles 110 towards the camera 102. For example, the nozzles 110 on the print die 108 may provide an opening across the cross-section to the print die 108. The light rays 126 may pass through the print die 108 via the nozzles 110 to reach the camera 102.

Figure 2:
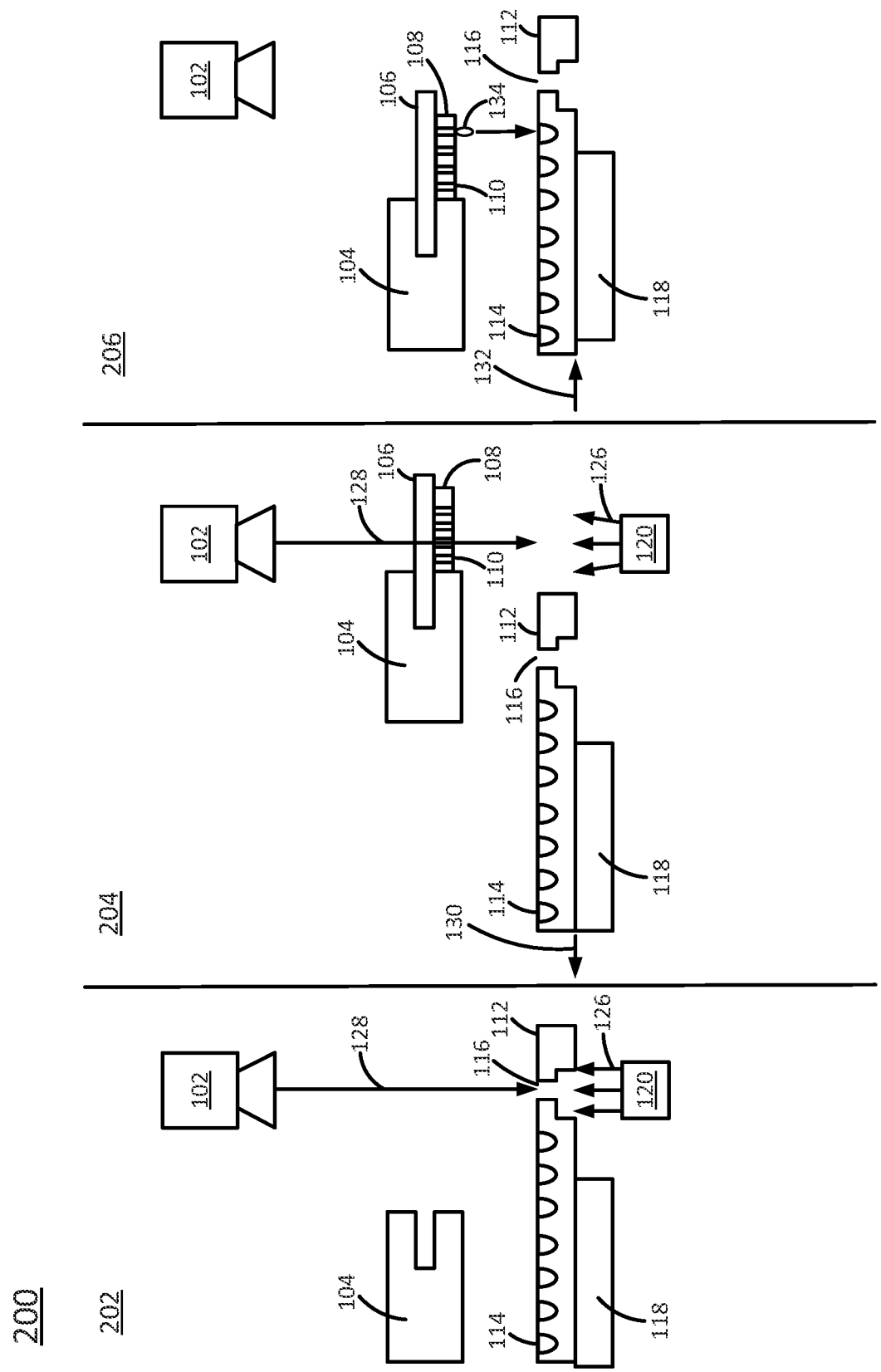
FIG. 2 is an example process flow of the registration of a print cartridge and a well plate using the registration system of the present disclosure.
Figure 3:
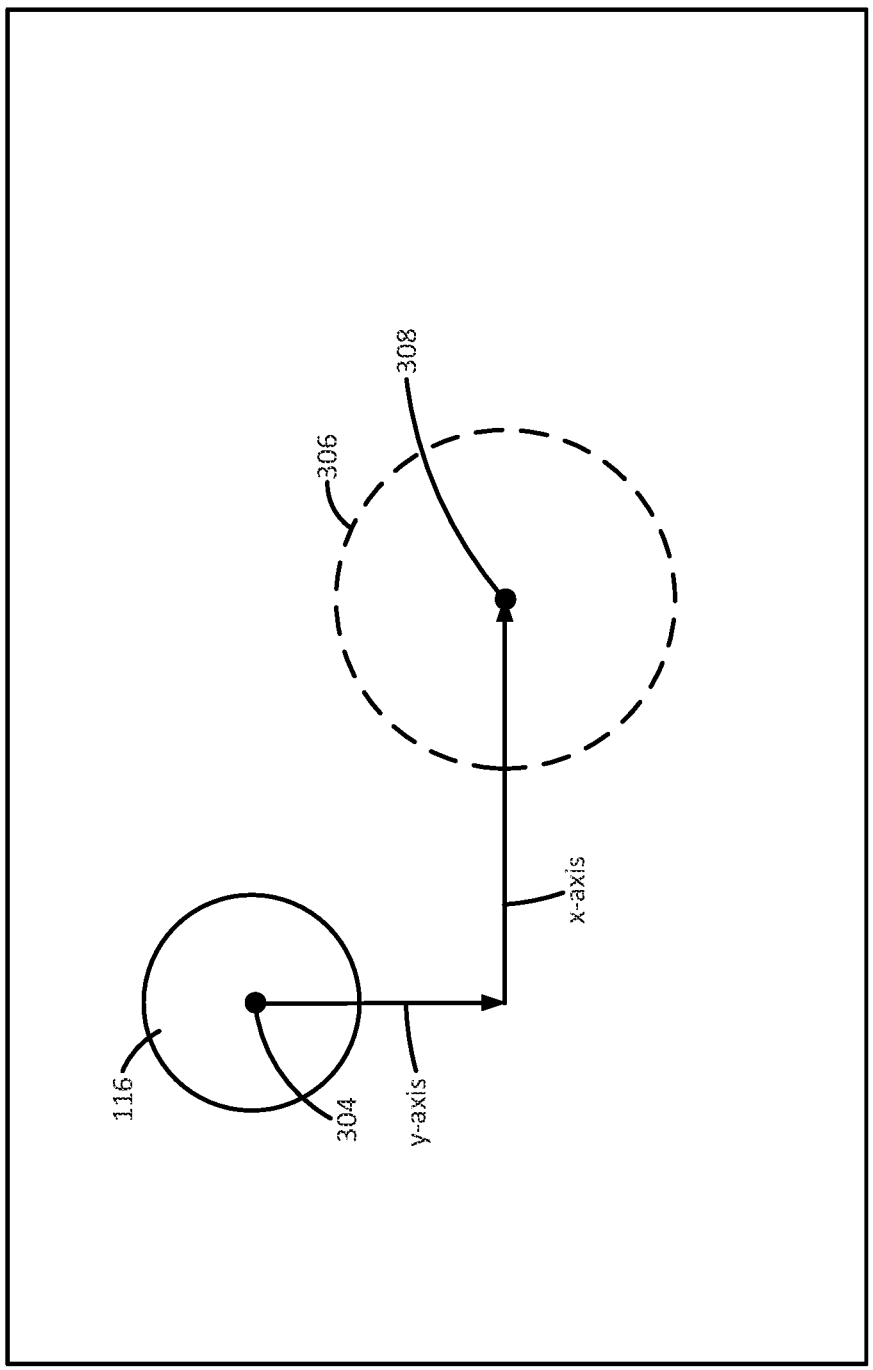
FIG. 3 is a top view of an example offset measurement of a fiducial of the well plate within a field of view of a camera of the registration system of the present disclosure.
Figure 4:
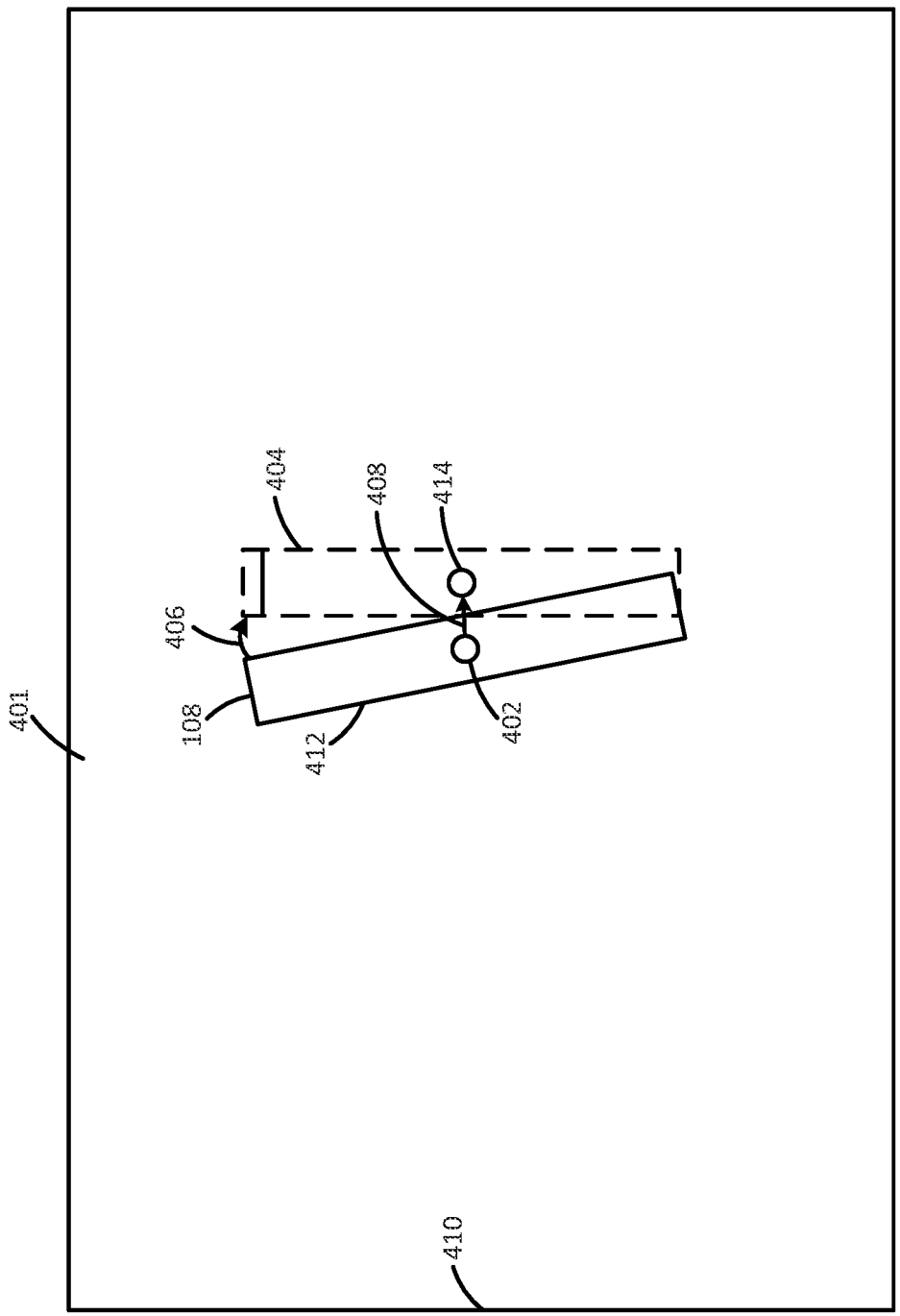
FIG. 4 is a top view of an example offset measurement of a print die of the print cartridge within a field of view of the camera of the registration system of the present disclosure.

With the help of the light rays 126 to illuminate the fiducial 116 and a nozzle 110, the camera 102 may capture an image of the print die 108 and an image of the fiducial 116. The offset for the well plate 102 may be calculated based on a position of the fiducial 116 compared to an expected position of the fiducial 116 (e.g., a center of a field of view of the camera 102). Similarly, the offset of the print die 108 may be calculated based on a position of the print die 108 compared to an expected position of the print die 108 (e.g., a center of a field of view of the camera 102). An example of the registration process and calculations are illustrated in FIGS. 2-4, and discussed in further details below.

In an example, the apparatus 100 may deploy a single camera 102 to capture both images. For example, rather than using separate cameras to capture an image of the print die 108 and the well plate 112, the present disclosure deploys a single camera 102 that is positioned to approximately focus on the print die 108 and the well plate 112, even though the print die 108 and the well plate 112 are located at different depths relative to the camera 102.

In an example, the camera 102 may be located a distance 124 away from the plate 112. The camera 102 may also include a lens that has a certain f-stop to allow the camera 102 to focus on the print die 108 and the well plate 112. In an example, a distance between the print die 108 and the stage 118 may be approximately 2 millimeters (mm). The lens of the camera 102 may have an f-stop of f/16 to bring the numerical aperture to approximately a depth of focus of 2 mm. An imaging wavelength of approximately 500 nanometers (nm) may be used for the camera 102. This may allow the sufficient sharpness of image for image of the print die 108 and the fiducial 116 of the well plate 112.

It should be noted that the apparatus 100 has been simplified for ease of explanation and may include additional components that are not shown. For example, the apparatus 100 may include a motor to move the stage 118 under control of the processor 136, a housing to enclose the apparatus 100, various mechanical arms or members to position the stage 118, the print cartridge holder 104, and the camera 102 properly as described above, a memory to store the calculated offsets to compensate the desired movement of the stage 118, and the like.

FIG. 2 illustrates an example registration process 200 using the apparatus 100 of the present disclosure. FIGS. 3 and 4 illustrate example calculations of how the offsets for the well plate 112 and the print die 108 are calculated.

In an example, the registration process 200 may begin at block 202. At block 202, the well plate 112 may be placed on the stage 118. The stage 118 may be moved to move the well plate 112 into a predefined position such that the fiducial 116 is located within a field of view of the camera 102. The registration of the well plate 112 may be performed without the print cartridge 106 placed in the print cartridge holder 104. In an example, the camera may be positioned such that an optical axis 128 of the camera 102 may be normal or perpendicular to a surface of the well plate 112.

At block 202, after the well plate 112 is moved into the predefined position, the camera 102 may capture an image of the fiducial 116. FIG. 3 illustrates an example image 300 of the fiducial 116. In an example, the image 300 may be representative of the field of view (FOV) of the camera 102. The expected location of the fiducial 116 may be a center of the FOV illustrated by dashed lines 306. The actual location of the fiducial 116 is shown offset from the dashed lines 306.

In an example, the processor 136 may calculate the offset associated with the well plate 112 by determining an amount of movement to move a center 304 of the fiducial 116 to a center 308 of the expected location represented by dashed lines 306. The amount of movement may be represented by (x, y) coordinates by determining an amount of movement along an x-axis and a y-axis to move the center 304 to the center 308.

In an example, if the well plate 112 includes multiple fiducials 116, the block 202 may be repeated for each fiducial 116. An average of the offsets for the well plate 112 may be calculated to determine the offset associated with the well plate 112.

At block 204, the stage 118 may be moved away from the camera 102 along a direction illustrated by an arrow 130. The print cartridge 106 with the print die 108 may be inserted into the print cartridge holder 104. The camera 102 may capture an image of the print die 108. The nozzles 110 of the print die 108 may allow the light rays 126 to pass through to allow the location of the nozzles 110 and a center portion of the print die to be visible in the image.

FIG. 4 illustrates an example image 400 of the print die 108. The image 400 may be representative of the FOV 401 of the camera 102. In an example, the offset associated with the print die 108 may include a rotational offset and a translational offset. The rotational offset may indicate an angle (as shown by arrow 406) of rotation around a center 402 of the print die 108 to move the print die 108 into an expected position illustrated by dashed lines 404. The translational offset may be an amount of movement along an x, y coordinate plane (as shown by an arrow 408) to move the print die 108 into an expected position illustrated by dashed lines 404.

The rotational offset and the translational offset may be calculated using two different approaches. In an example, a first approach may include a two-step process that calculates the rotational offset and then calculates the translational offset. For example, the processor 136 may know the coordinates of an edge 410 of the FOV 401 of the camera 102. The processor 136 may then using image processing to detect an edge 412 of the print die 108 in the image 400. One example of an edge detection function may include the Canny edge detector, followed by a line estimation (e.g., a Hough Transformation). The processor 136 may calculate the rotational offset by determining an amount of rotation around the center 402 of the print die 108 to allow the edge 412 to be parallel to the edge 410.

After the rotational offset is calculated, the processor 136 may modify the image 400 such that the print die 108 is rotated by the calculated rotational offset. The processor 136 may then calculate an amount of movement along the x-axis and the y-axis such that the center 402 of the print die 108 is aligned with a center 414 of an expected position illustrated by dashed lines 404.

In a second example, a single-step approach may be applied. For example, templates of the print die 108 may be stored in memory. The templates may indicate an expected location of the print die 108 within the FOV 401 of the camera 102. For example, the dashed lines 404 may represent a template. The processor 136 may then manipulate the image of the print die 108 until the print die 108 is aligned with the template within the dashed lines 404. The rotational offset and the translational offset may be calculated based on the amount of movement and/or manipulation that was performed on the image of the print die 108 to match the template represented by the dashed lines 404.

In an example, a plurality of different templates may be stored for different print die. For example, different sizes and dimensions of print die may be used for different applications. Thus, the template may be selected based on the type of print die that is used in the print cartridge, and then the template matching may be performed to calculate the rotational offset and the translational offset of the print die 108.

Referring back to FIG. 2, after the offsets of the well plate 112 and the print die 108 are calculated, the offsets may be stored in memory. At block 206, the processor 136 may receive a request to dispense a fluid 134 into a particular well 114 of the well plate 112. The processor 136 may control movement of the stage 118 until the particular well 114 is located below a nozzle 110 that dispenses the selected fluid 134. The amount of movement of the stage 118 may be adjusted, or compensated for, by the offsets of the well plate 112 and the print die 108 that were calculated in blocks 202 and 204. As a result, the accuracy of a center of the nozzle 110 to a center of the well 114 may be within a few microns (e.g., within 1 to 6 than microns).

In an example, the apparatus 100 may also compensate for jetting bias. Jetting bias may be caused by tilt of the nozzles 110. For example, fluids may be ejected from the nozzles 110 at an angle due to off-plane tilt of the print die 108 in the print cartridge 106 or due to the position in the print cartridge holder 104. Jetting bias may also be caused by fluidics of the jetting process, like puddling effects, charging, or other capillary effects at the ejection orifice or nozzle 110.

Figure 5:
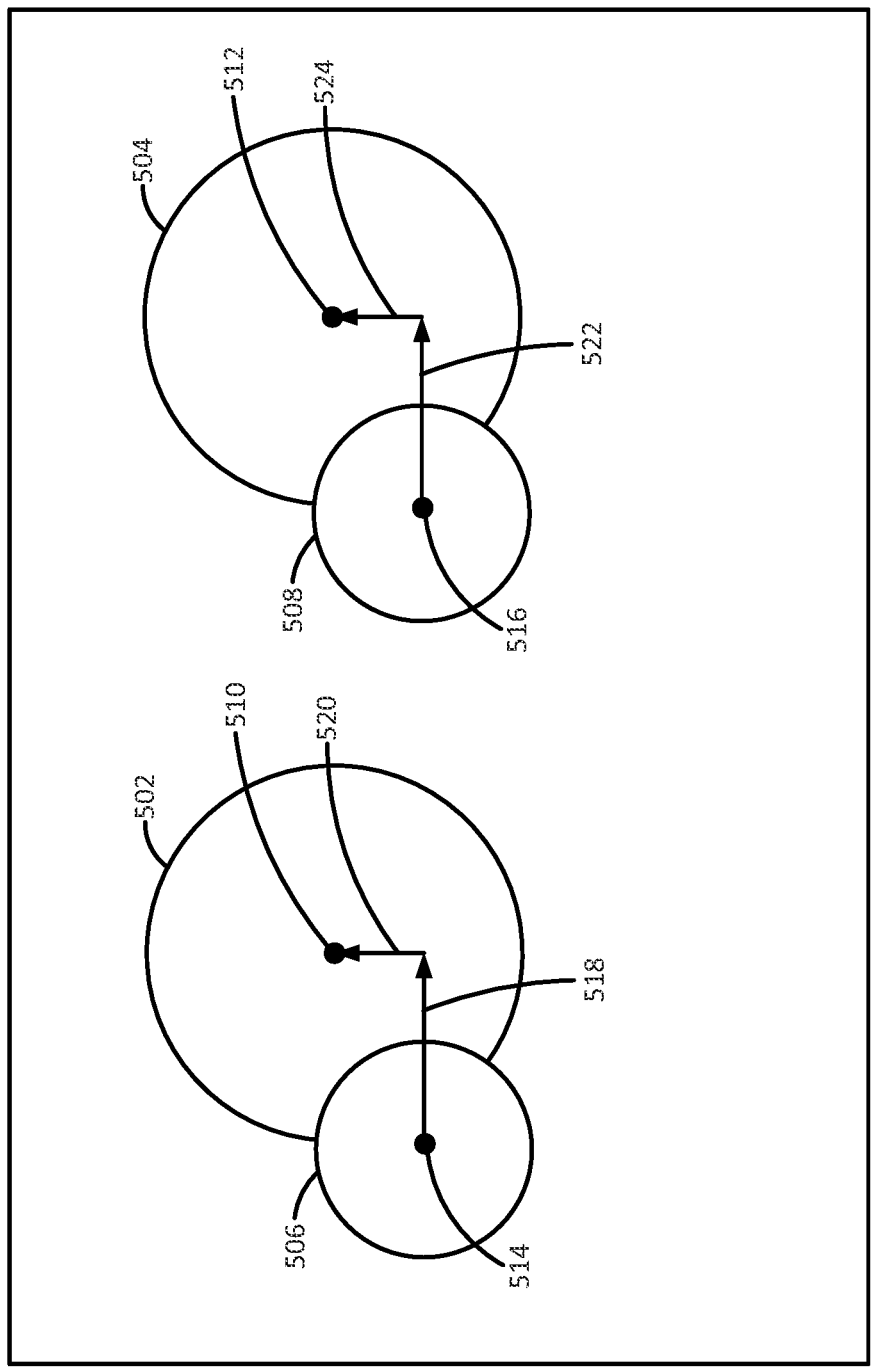
FIG. 5 is a top view of an example offset measurement to correct jetting bias using the registration system of the present disclosure.

FIG. 5 illustrates an example of how the jetting bias offset may be calculated. In an example, the jetting bias offset may be calculated by dispensing or jetting fluid 506 and 508 from the nozzles 110 on a substrate 500. The substrate 500 may have locations 502 and 504 where the fluids 506 and 508 are expected to be dispensed.

In an example, image analysis may be used by the processor 136 to detect the locations 502 and 504 and to estimate centers of the locations 502 and 504 where the jetting fluid 506 and 508 should be dispensed, respectively. A location of a center of the jetting fluid 506 and 508 may also be calculated using the image analysis.

The jetting bias offset of a nozzle 110 may be calculated by calculating an amount of movement to move a center 514 of the fluid 506 to a center 510 of the location 502. Similarly, the jetting bias offset may be calculated for a second nozzle 110 by calculating an amount of movement to move a center 516 of the fluid 508 to a center 512 of the location 504. The amount of movement may be a vector that includes movement along an x-axis 518 and 522, respectively, and a y-axis 520 and 524, respectively. Although two locations 502 and 504 are illustrated in FIG. 5, it should be noted that the jetting bias offset calculation may be performed for any number of nozzles 110.

The jetting bias offset may also be stored in memory of the apparatus 100. The jetting bias offset may be added to the offset associated with the well plate 112 and the offset associated with the print die 108. The combined offset may be used to compensate for the movement of the stage 118.

In an example, the offset may also include a nozzle offset. For example, different nozzles 110 on the print die 108 may have different amounts of offset. The nozzle offset of the nozzles 110 on a print die 108 may be fixed and stored in a look up table. The processor 136 may determine which nozzle 110 is to eject the desired fluid and determine the amount of nozzle offset using the look up table for a particular print die 108.

As a result, the total offset may include a combination of an offset associated with a well plate, an offset associated with a print die, a nozzle offset, and a jetting bias offset. In other words, the correct position (x, y) of the stage 118 may be the user defined dispense location for a particular well 114 compensated by the (x, y) offset of the well plate 112, the (x, y) offset of the print die 108, the (x, y) offset of the nozzle that is to dispense the fluid, and the (x, y) offset associated with the jetting bias.

Figure 6:
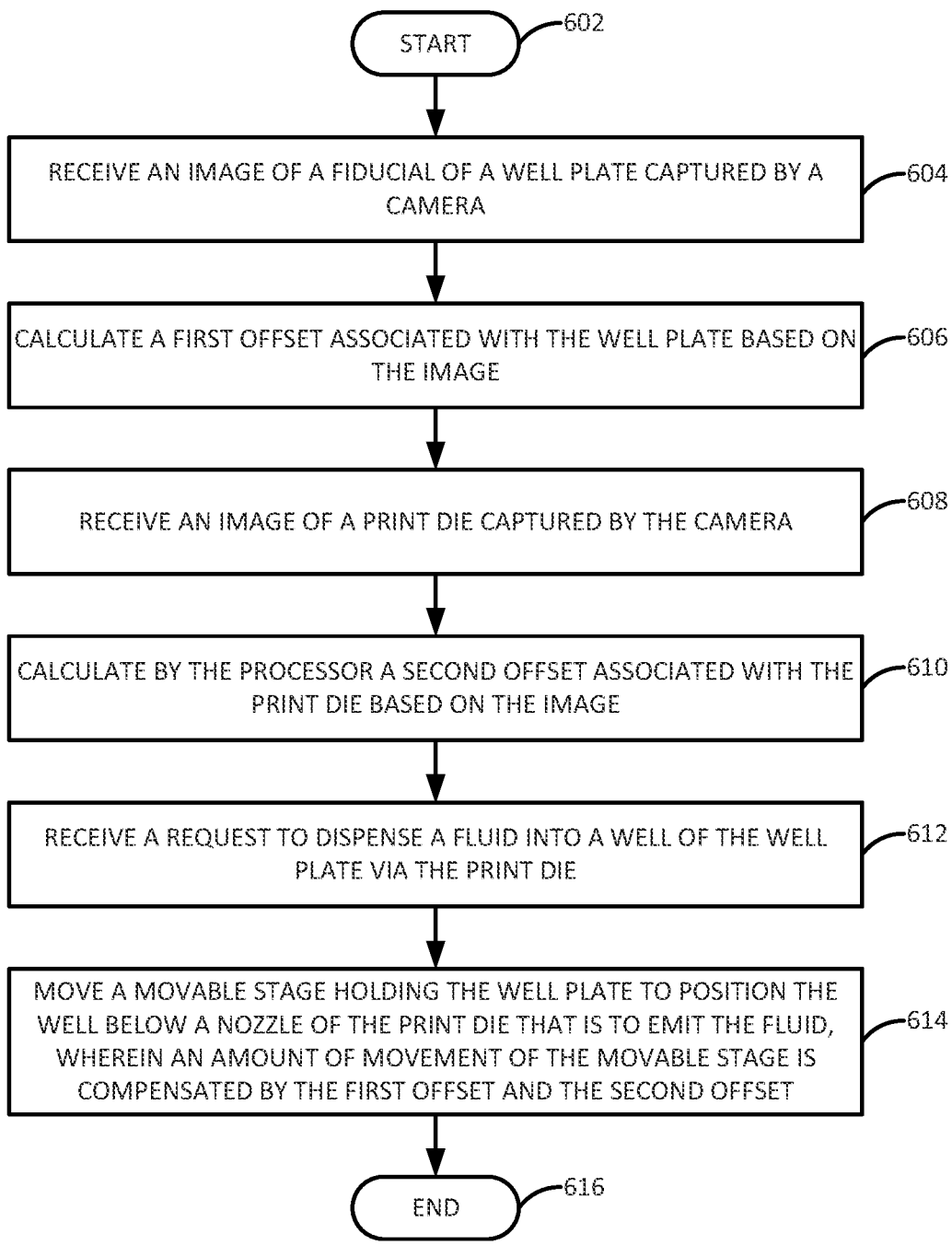
FIG. 6 is a flow chart of an example method to calculate an amount of offset of a well plate and print die using a registration system of the present disclosure.

FIG. 6 illustrates a flow diagram of an example method 600 for calculating an amount of offset of a well plate and print die using a registration system of the present disclosure. In an example, the method 600 may be performed by one of the apparatus 100 illustrated in FIG. 1 or the apparatus 700 illustrated in FIG. 7, and described below.

At block 602, the method 600 begins. At block 604, the method 600 receives an image of a fiducial of a well plate captured by a camera. For example, the fiducial may be a reference marker that is optically clear on the well plate. A light source may be used to emit light through the fiducial to provide a high contrast image of the fiducial captured by the camera.

At block 606, the method 600 calculates a first offset associated with the well plate based on the image. In an example, the first offset may be calculated using any of the methods described above and illustrated in FIG. 3.

In an example, the blocks 604 and 606 may be repeated if the well plate includes multiple fiducials. For example, the well plate may include fiducials on the corners of the well plate. An average of the offsets of the fiducials may be calculated to determine the first offset if more than one fiducial is included in the well plate.

At block 608, the method 600 receives an image of a print die captured by the camera. For example, the nozzles of the print die may be hollow openings that allow light emitted by a light source towards the camera to pass through. In an example, the print die may include a center opening that also allows the light emitted by a light source to pass through. The light may provide a high contrast image to allow the center of the print die to be located in the image and used as a point of reference to calculate the offset of the print die.

As noted above, a single camera may be used to capture the images in block 604 and 608. Moreover, the images may be captured without any adjustment of the focus of the lenses of the camera 102. For example, a single camera 102 may be positioned over the stage and a print cartridge holder such that the well plate and the print die are in focus.

In an example, the focus of the print die may be preferred over the focus of the fiducial on the well plate. For example, the camera may be set such that the focus is set to produce a sharper image of the print die than the image of the fiducial. Setting the camera at a proper distance from the stage and using the correct f-stop lens for the camera may allow a single camera to capture images of the print die and the fiducial that are sufficiently focused to be analyzed and to calculate the first offset and the second offset.

At block 610, the method 600 calculates a second offset associated with the print die based on the image. The second offset associated with the print die may include a rotational offset and a translational offset. The second offset may be calculated using any of the methods described above and illustrated in FIG. 4.

At block 612, the method 600 receives a request to dispense a fluid into a well of the well plate via the print die. For example, first offset and the second offset may be stored in memory. The apparatus may be ready to prepare samples using fluids ejected by the print die. The sample preparation process may include selecting a fluid ejected by a particular nozzle of the print die to be ejected into a selected well of the well plate.

At block 614, the method 600 moves a movable stage holding the well plate to position the well below a nozzle of the print die that is to emit the fluid, wherein an amount of movement of the movable stage is compensated by the first offset and the second offset. For example, the amount of movement may be accurately controlled by adjusting the amount of movement by the first offset and the second offset. In an example, additional offsets may be calculated to provide additional accuracy. For example, a nozzle offset may be determined for the print die that is deployed using a look up table. In addition, a jetting bias offset may be calculated using the methods described above and illustrated in FIG. 5. At block 616, the method 600 ends.

Figure 7:
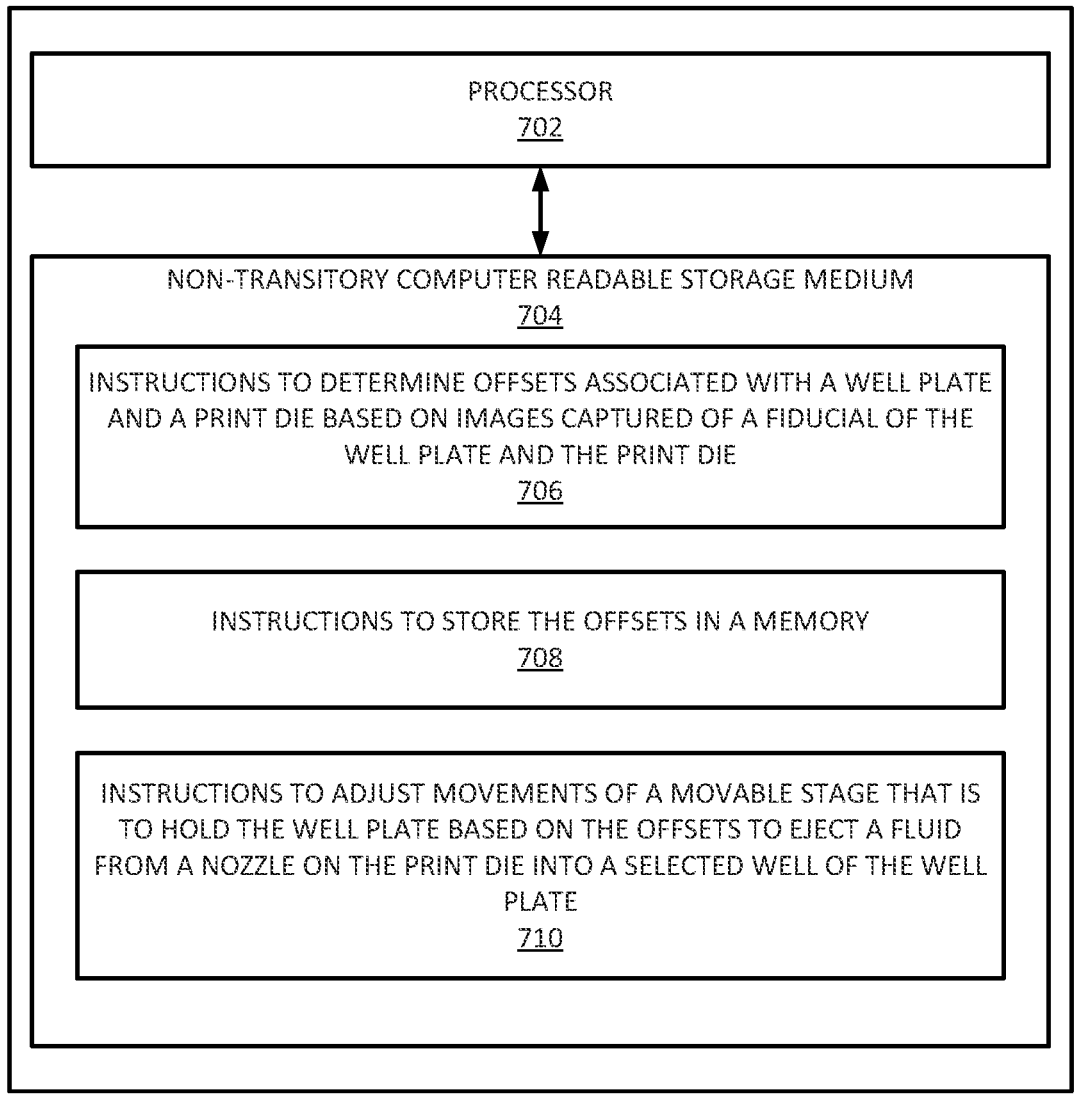
FIG. 7 is an example non-transitory computer readable storage medium storing instructions executed by a processor to calculate an amount of offset of a well plate and print die.

FIG. 7 illustrates an example of an apparatus 700. In an example, the apparatus 700 may be one of the apparatus 100. In an example, the apparatus 700 may include a processor 702 and a non-transitory computer readable storage medium 704. The non-transitory computer readable storage medium 704 may be encoded with instructions 706, 708, and 710 that, when executed by the processor 702, cause the processor 702 to perform various functions.

In an example, the instructions 706 may include determining instructions 706. For example, the instructions 706 may determine offsets associated with a well plate and a print die based on images captured of a fiducial of the well plate and the print die.

The instructions 708 may include storing instructions. For example, the instructions 708 may store the offsets in a memory.

The instructions 710 may include adjusting instructions. For example, the instructions 710 may adjust movements of a movable stage that is to hold the well plate based on the offsets to eject a fluid from a nozzle on the print die into a selected well of the well plate.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

The invention claimed is:

1. An apparatus, comprising:
   a movable stage to hold a well plate;
   a print cartridge holder to hold a print cartridge comprising a print die over the movable stage, wherein the print die is to eject fluid;
   a camera located above the movable stage and the print cartridge holder, wherein the camera is positioned such that the movable stage and the print die are within a field of view of the camera;
   a processor to calculate a first offset of the well plate and a second offset of the print die based on an image of the movable stage and the print die captured by the camera and to control movement of the movable stage in accordance with the first offset and the second offset; and
   a memory to store a template of the print die, wherein the template is compared to the image of the movable stage and the print die captured by the camera to calculate the second offset.

2. The apparatus of claim 1, further comprising:
   a light source located below the movable stage to emit light towards the camera.

3. The apparatus of claim 2, wherein the well plate comprises a fiducial that is captured by the camera to measure the first offset.

4. The apparatus of claim 3, wherein the fiducial is optically clear to allow the light emitted by the light source to pass through towards the camera.

5. The apparatus of claim 1, wherein the second offset comprises a rotational offset and a translational offset.

6. A method, comprising:
   receiving, by a processor, an image of a fiducial of a well plate captured by a camera;
   calculating, by the processor, a first offset associated with the well plate based on the image of the fiducial;
   receiving, by the processor, an image of a print die captured by the camera;
   calculating, by the processor, a second offset associated with the print die based on the image of the print die, wherein calculating the second offset comprises:
      determining, by the processor, an edge of the print die; and
      determining, by the processor, an amount of rotational offset based on a comparison of the edge of the print die to an edge of a field of view of the camera;
   receiving, by the processor, a request to dispense a fluid into a well of the well plate via the print die; and
   moving, by the processor, a movable stage holding the well plate to position the well below a nozzle of the print die that is to emit the fluid, wherein an amount of movement of the movable stage is compensated by the first offset and the second offset.

7. The method of claim 6, wherein calculating the first offset comprises:
   determining, by the processor, an amount of movement along a vertical axis and a horizontal axis to align a center of the fiducial to a center of a field of view of the camera.

8. The method of claim 6, further comprising:
rotating, by the processor, the image of the print die by the amount of rotational offset;
determining, by the processor, a center of the print die; and
determining, by the processor, a translational offset based on an amount of movement along a vertical axis and a horizontal axis to align the center of the print die to a center of a field of view of the camera.

9. The method of claim 6, wherein the amount of movement is further compensated by a nozzle offset of the nozzle.

10. A non-transitory computer readable storage medium encoded with instructions which, when executed, cause a processor of an apparatus to:
determine offsets associated with a well plate and a print die based on images captured of a fiducial of the well plate and the print die, the processor to determine the offsets at least by determining a nozzle offset of the print die based on a look up table for the print die;
store the offsets in a memory; and
adjust movements of a movable stage that is to hold the well plate based on the offsets to eject a fluid from a nozzle on the print die into a selected well of the well plate.

11. The non-transitory computer readable storage medium of claim 10, further causing the processor to:
determine offsets of a jetting bias.

12. The non-transitory computer readable storage medium of claim 11, wherein the instructions to cause the processor to determine offsets of the jetting bias comprise instructions to cause the processor to:
cause the print die to dispense a plurality of test droplets on a substrate at desired locations; and
measure an amount of movement along a vertical axis and a horizontal axis to align a center of the plurality of test droplets to a center of the desired locations.

\* \* \* \* \*